(12) United States Patent
Sollenberger et al.

(10) Patent No.: US 12,369,529 B2
(45) Date of Patent: Jul. 29, 2025

(54) VARIABLE CROSS-SECTION VANE FOR TRANSITION CONE IN COMBINE HARVESTER

(71) Applicant: CNH Industrial America LLC, New Holland, PA (US)

(72) Inventors: Benjamin Sollenberger, Petersburg, PA (US); Wayne T. Flickinger, Oxford, PA (US); Curtis Hillen, Lititz, PA (US)

(73) Assignee: CNH Industrial America LLC, Holland, PA (US)

(*) Notice: Subject to any disclaimer, the term of this patent is extended or adjusted under 35 U.S.C. 154(b) by 843 days.

(21) Appl. No.: 17/565,774

(22) Filed: Dec. 30, 2021

(65) Prior Publication Data

US 2023/0210055 A1 Jul. 6, 2023

(51) Int. Cl.
| | | |
|---|---|---|
| A01F 7/06 | (2006.01) | |
| A01F 12/10 | (2006.01) | |
| A01F 12/26 | (2006.01) | |

(52) U.S. Cl.
CPC ............. *A01F 7/067* (2013.01); *A01F 12/10* (2013.01); *A01F 12/26* (2013.01)

(58) Field of Classification Search
CPC ........... A01F 7/067; A01F 12/10; A01F 12/26
See application file for complete search history.

(56) References Cited

U.S. PATENT DOCUMENTS

| | | | | |
|---|---|---|---|---|
| 3,827,443 A | * | 8/1974 | Drayer ................. | A01F 12/00 460/16 |
| 4,192,322 A | * | 3/1980 | Wilson ................. | A01F 12/22 460/70 |
| 4,328,815 A | * | 5/1982 | Rowland-Hill ......... | A01F 12/10 460/16 |
| 4,900,290 A | * | 2/1990 | Tanis ................... | A01F 12/10 460/70 |
| 5,145,461 A | * | 9/1992 | Tanis ................... | A01F 12/10 460/68 |
| 5,145,462 A | | 9/1992 | Tanis et al. | |

(Continued)

FOREIGN PATENT DOCUMENTS

| | | |
|---|---|---|
| EP | 1147701 A1 | 10/2001 |
| EP | 3632200 A1 | 4/2020 |
| WO | WO-2019178466 A1 * 9/2019 | ............. A01F 12/10 |

OTHER PUBLICATIONS

Extended European Search Report for EP Application No. 22213080.9 dated May 26, 2023 (eight pages).

*Primary Examiner* — Arpad Fabian-Kovacs
(74) *Attorney, Agent, or Firm* — Peter K. Zacharias; Rebecca L. Henkel; Rickard K. DeMille

(57) ABSTRACT

An agricultural harvester includes a threshing system having a rotor, a rotor cage surrounding the rotor and including a concave, and a transition cone defining an infeed to the rotor cage. The transition cone has a conical inner surface extending in an axial direction between an upstream end and a downstream end of the cone. A vane is mounted to the conical inner surface of the transition cone. The vane protrudes radially from the conical inner surface, and extends along an axial direction between the upstream end and the downstream end. The vane has a body extending along an axis and a cross-sectional shape that is not constant along the axis.

19 Claims, 4 Drawing Sheets

(56) References Cited

U.S. PATENT DOCUMENTS

| | | | | |
|---|---|---|---|---|
| 5,257,959 | A * | 11/1993 | Tanis | A01F 12/10 460/68 |
| 5,387,153 | A * | 2/1995 | Tanis | A01F 7/06 460/68 |
| 6,050,894 | A * | 4/2000 | Johnson | A01F 7/06 460/68 |
| 6,129,629 | A * | 10/2000 | Dammann | A01F 12/442 460/80 |
| 6,830,512 | B2 * | 12/2004 | Tanis | A01F 7/06 460/68 |
| 6,902,477 | B2 | 6/2005 | Braunhardt | |
| 9,807,937 | B2 * | 11/2017 | Flickinger | A01F 12/24 |
| 10,123,485 | B2 | 11/2018 | Ricketts et al. | |
| 10,420,285 | B2 | 9/2019 | Flickinger et al. | |
| 11,083,136 | B2 | 8/2021 | Ricketts et al. | |
| 2004/0023703 | A1 * | 2/2004 | Tanis | A01F 7/06 460/68 |
| 2017/0079212 | A1 * | 3/2017 | Bok | A01F 7/067 |
| 2017/0105350 | A1 | 4/2017 | Ricketts et al. | |
| 2019/0069489 | A1 * | 3/2019 | Ricketts | A01F 12/20 |

* cited by examiner

VARIABLE CROSS-SECTION VANE FOR TRANSITION CONE IN COMBINE HARVESTER

FIELD OF THE INVENTION

The present invention relates generally to agricultural harvesters such as combine harvesters (combines), and more particularly to feeder housing transition cones of threshing or separating systems in such combines, and still more particularly to vanes on the inner surfaces of the transition cones.

BACKGROUND OF THE INVENTION

As is described in U.S. Pat. No. 11,083,136 to Case New Holland, which is incorporated by reference in its entirety and for all purposes, in combine harvesters having a rotor operating within a concave formed as a rotor cage, it is known to provide a transition cone between the feeder housing and the rotor cage. The transition cone narrows along its length, from the upstream end to the downstream end of the cone. An auger flight operated by the rotor transports the cut crop material through the transition cone, and into the threshing cage. It is known to provide helical vanes on the inside surface of the transition cone, to facilitate efficient transport of crop material through the transition cone. Known transition cone vanes are traditionally made from angle-iron or other L-shaped material that is additionally shaped to conform to the inner surface of the transition cone, along a generally helical or spiral path. A plurality of vanes may be used in each transition cone. The transition cone vanes operate to direct and orient the crop material transported there along by the rotating auger flight.

During use, the crop material tends to follow along the transition cone vane and is somewhat compressed against the inside surface of the narrowing cone. The crop is then transported into the rotor cage. Experience has shown that the greatest regions of wear occur on the inner surface of the transition cone immediately downstream from the upstanding portions of the transition cone vanes. Experience has also shown that crop has a tendency to recirculate around the transition cone before entering the rotor cage due to the geometry of (at least) the vane, which further results in wear on the inner surface of the transition cone.

It would be desirable to provide a vane for the transition cone that improves the movement of crop material into the rotor cage, and minimizes wear.

SUMMARY OF THE INVENTION

According to one aspect of the invention, an agricultural harvester comprises: a threshing system including a rotor, a rotor cage surrounding the rotor and including a concave; a transition cone defining an infeed to said rotor cage, said transition cone having a conical inner surface extending in an axial direction between an upstream end and a downstream end; and a vane mounted to the conical inner surface of said transition cone. Said vane protrudes radially from the conical inner surface, and extending along an axial direction between said upstream end and said downstream end. Said vane has a body extending along an axis and a cross-sectional shape that is not constant along the axis.

According to another aspect of the invention, an agricultural harvester comprises: a threshing system including a rotor, a rotor cage surrounding the rotor and including a concave, wherein the rotor cage has a cylindrically shaped interior surface extending along a rotor cage axis; a transition cone defining an infeed to said rotor cage, said transition cone having a conical inner surface extending in an axial direction between an upstream end and a downstream end; and a vane mounted to the conical inner surface of said transition cone. Said vane protrudes radially from the conical inner surface, and extends between said upstream end and said downstream end. Said vane has a base mounting surface and a projecting segment that projects in a radial direction from the base mounting surface. The projecting segment has a downstream facing side that faces the downstream end of the cone and an upstream facing side that faces the upstream end of the cone. At or near the upstream end of the cone, the downstream facing side of the vane is oriented perpendicular to the base mounting surface, and, at or near the downstream end of the cone, the downstream facing side of the vane is oriented perpendicular to the rotor cage axis.

According to yet another aspect of the invention, a transition cone assembly for a combine harvester comprises: a transition cone having a body extending along a longitudinal axis, the body defining a conical inner surface extending between an upstream end and a downstream end of the cone; and a vane having a base mounting surface that is mounted to the conical inner surface and a projecting segment that projects in a radial direction from the base mounting surface. The projecting segment has a downstream facing side that faces the downstream end of the cone and an upstream facing side that faces the upstream end of the cone. At or near the upstream end of the cone, the downstream facing side of the vane is oriented perpendicular to the base surface, and, at or near the downstream end of the cone, the downstream facing side of the vane is oriented perpendicular to the longitudinal axis of the cone

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

The invention, including its construction and method of operation, is illustrated more or less diagrammatically in the drawings, in which.

DETAILED DESCRIPTION OF THE INVENTION

Figure 1:
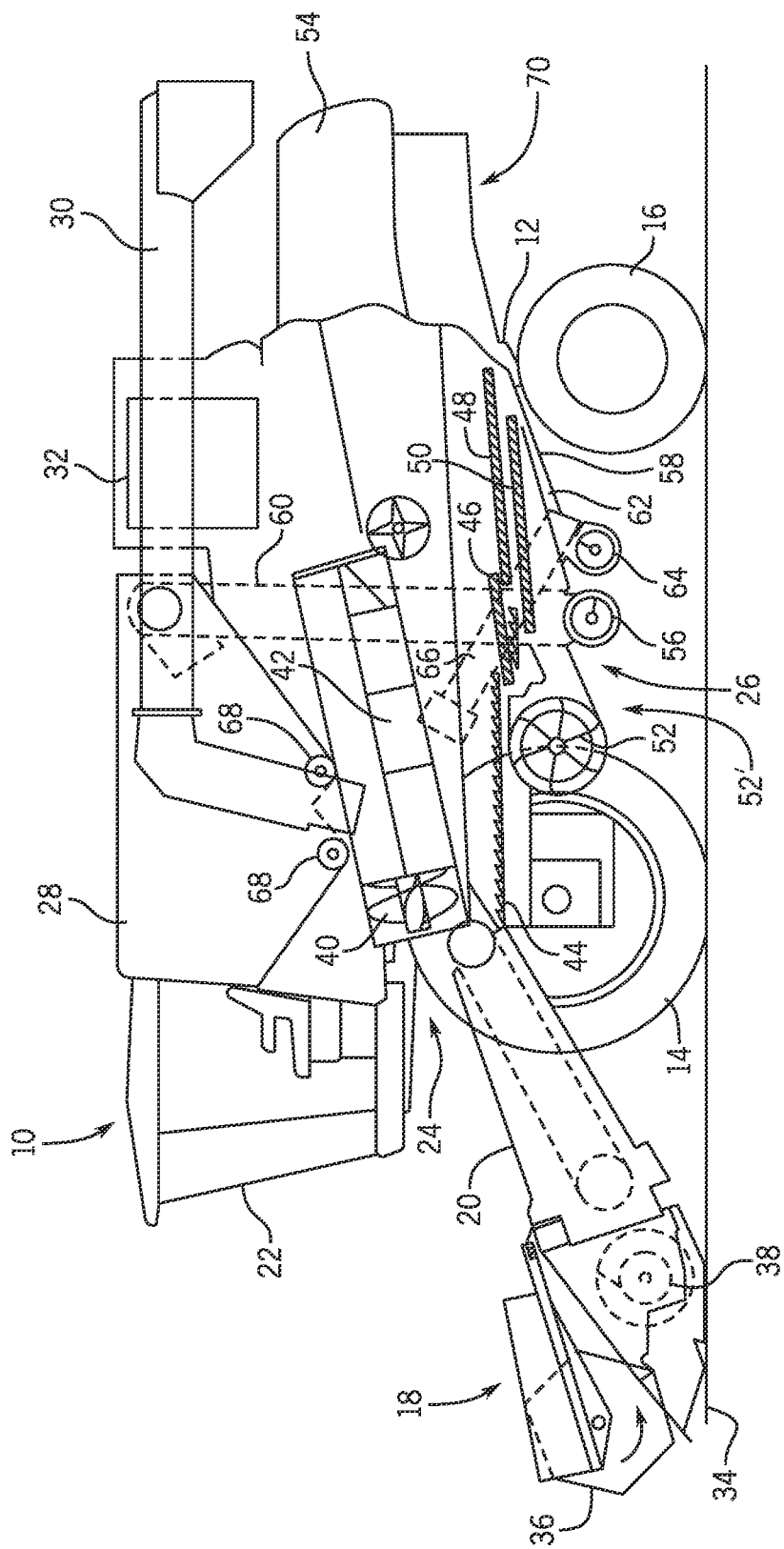
FIG. 1 is a side view of an embodiment of an agricultural harvester in the form of a combine, which includes a transition cone having vanes of the present invention.

Corresponding reference characters indicate corresponding parts throughout the several views. The exemplification set out herein illustrates an embodiment of the invention, in one form, and such exemplification is not to be construed as limiting the scope of the invention in any manner.

The terms "upper", "lower", "fore", "aft," "forward", "rearward", "left" and "right", when used in connection with the agricultural harvester and/or components thereof are usually determined with reference to the direction of forward operative travel of the combine harvester, but again, they should not be construed as limiting. The terms "longitudinal" and "transverse" are determined with reference to the fore-and-aft direction of the agricultural harvester and are equally not to be construed as limiting. The terms "upstream" and "downstream" are determined with reference to the direction of movement of crop material through the combine. The term "axial" and "radial" are determined with reference to the rotor, unless noted otherwise.

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, material other than grain (MOG) or straw. Incompletely threshed crop material is referred to as "tailings".

Referring now to the drawings, and more particularly to FIG. 1, there is shown an agricultural harvester in the form of a combine 10, which generally includes a chassis 12, ground engaging front wheels 14 and rear wheels 16, a header 18, a feeder housing 20, an operator cab 22, a threshing and separating system 24, a cleaning system 26, a grain tank 28, and an unloading auger 30.

Motive force is selectively applied to front wheels 14 through a power plant in the form of a diesel engine 32 and a transmission (not shown). Although combine 10 is shown as including front wheels 14 and rear wheels 16, it is also to be understood that combine 10 may include tracks, such as full tracks or half-tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 generally includes a rotor 40 at least partially enclosed by and rotatable within a corresponding perforated rotor cage 42. The cut crops are threshed and separated by the rotation of rotor 40 within rotor cage 42, and larger elements, such as stalks, leaves and the like are discharged from the rear of combine 10. Smaller elements of crop material including grain and non-grain crop material, including particles lighter than grain, such as chaff, dust and straw, are discharged through perforations of rotor cage 42. Rotor 40 is shown in a representative sense in that rotor 40 may be more than one rotor 40 and may be oriented generally in line with the direction of travel of combine 10. So also, rotor cage 42 can be more than one rotor cage 42, or more than one rotor cage section commonly referred to as concaves.

Grain that has been separated by threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48, and 50 is subjected to a cleaning action by fan 52, which provides airflow through the sieves to remove chaff and other lightweight impurities, such as dust, from the grain by making the lightweight material airborne for discharge from a straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in fore-to-aft manner to spread the grain across sieves 48, 50, while permitting the passage of cleaned grain by gravity through the openings of sieves 48, 50.

Clean grain falls to a clean grain auger 56 positioned crosswise below and at the front of lower sieve 50. Clean grain auger 56 receives clean grain from each sieve 48, 50 and from a bottom pan 62 of cleaning system 26. Clean grain auger 56 conveys the clean grain laterally to a generally vertically arranged grain elevator 60 for transport to the grain tank 28. Tailings from cleaning system 26 fall to a tailings auger trough 58, and are transported via a tailings auger 64 and a return auger 66 to the upstream end of the cleaning system 26 for repeated cleaning action. A pair of grain tank augers 68 at the bottom of the grain tank 28 conveys the clean grain laterally within the grain tank 28 to the unloading auger 30 for discharge from combine 10.

The non-grain crop material proceeds through a residue handling system 70 leading to discharge from straw hood 54. The residue handling system can include a chopper, counter knives, a windrow door and a residue spreader, not shown but well understood and familiar to those skilled in the art.

Figure 2:
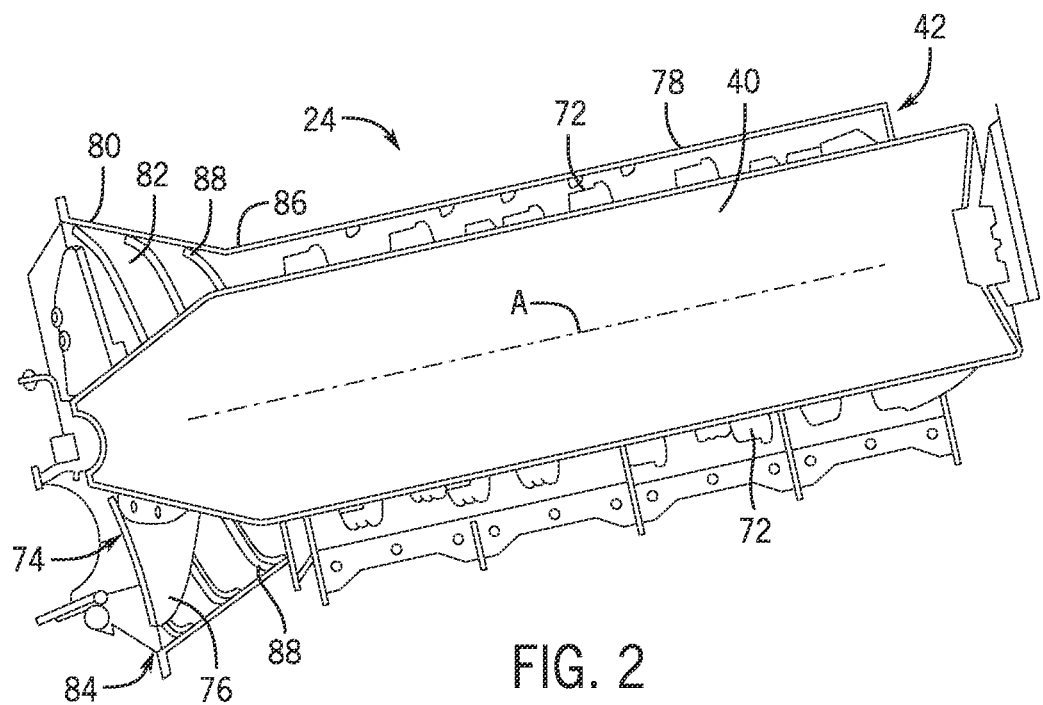
FIG. 2 is a cross-sectional side view of the threshing and separating system in the harvester shown in FIG. 1, and including the transition cone having vanes of the present invention.

Now, additionally referring to FIG. 2, further details of threshing and separating system 24 are shown. Rotor 40 includes a downstream portion having threshing elements 72, and an upstream portion defining an inlet auger 74 having an auger flight or flights 76. Rotor cage 42 includes a concave or concaves 78 operating together with threshing elements 72 of rotor 40 to separate grain from crop material.

A transition cone 80 is connected to rotor cage 42 and defines an infeed to the threshing zone of rotor 40 and rotor cage 42. Although cone 80, cage 42 and rotor 40 are shown as coaxial, it should be understood that those components are not limited to being coaxial. Transition cone 80 has a hollow conical shape including an inner cone surface 82 having a larger diameter at the upstream end 84 thereof and tapering to a smaller diameter at the downstream end 86 thereof, thereby defining a decreasing inner circumference about the inner surface from upstream end 84 to downstream end 86. At least one and typically a plurality of vanes 88 is provided on the inner surface of transition cone 80.

In operation, inlet auger 74 operates within transition cone 80, and crop material is transferred through transition cone 80 under the force applied by rotating auger flight 76, the directional guidance provided by vanes 88 and the influence supplied by the tapering conical shape of transition cone 80. The crop material is thereby distributed and arranged for threshing in rotor cage 42.

Figure 4:
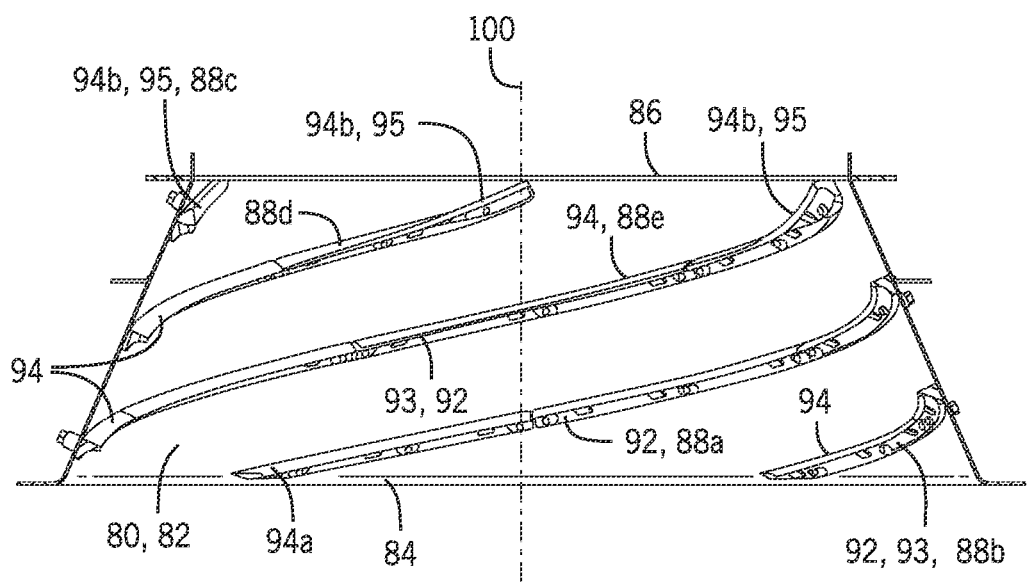
FIG. 4 is a cross-sectional view of the transition cone of FIG. 3 taken along the lines 4-4.
Figure 5:
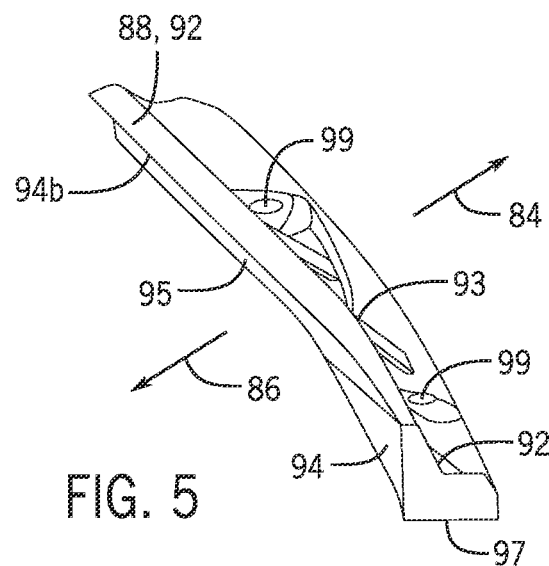
FIG. 5 is a topside isometric view of a segment of one of the transitional vanes of the transition cone.
Figure 6:
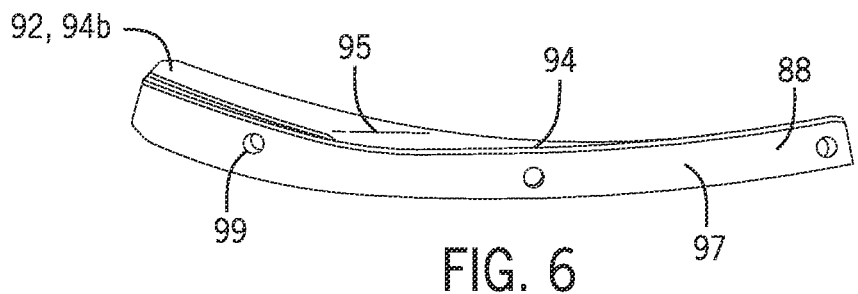
FIG. 6 is a bottom side isometric view of the transitional vane of FIG. 5.

Turning back to the features of vanes 88 shown in FIGS. 4-6, transition cone 80 includes five vanes 88a-88e (referred to either individually or collectively as vane(s) 88), each vane 88 extending axially from a location near upstream end 84 of transition cone 80 to a location near downstream end 86, while spiraling along approximately one half the circumference of the inner surface. Each vane 88 has a conical spiral shape. The vanes 88 are spaced evenly about the inner surface of transition cone 80. It should be understood that the use of five vanes 88 is merely exemplary, and in specific embodiments or applications, more or fewer vanes also might be used. Also, one or more the vanes 88 may not extend completely from upstream end 84 to downstream end 86 of cone 80.

Figure 3:
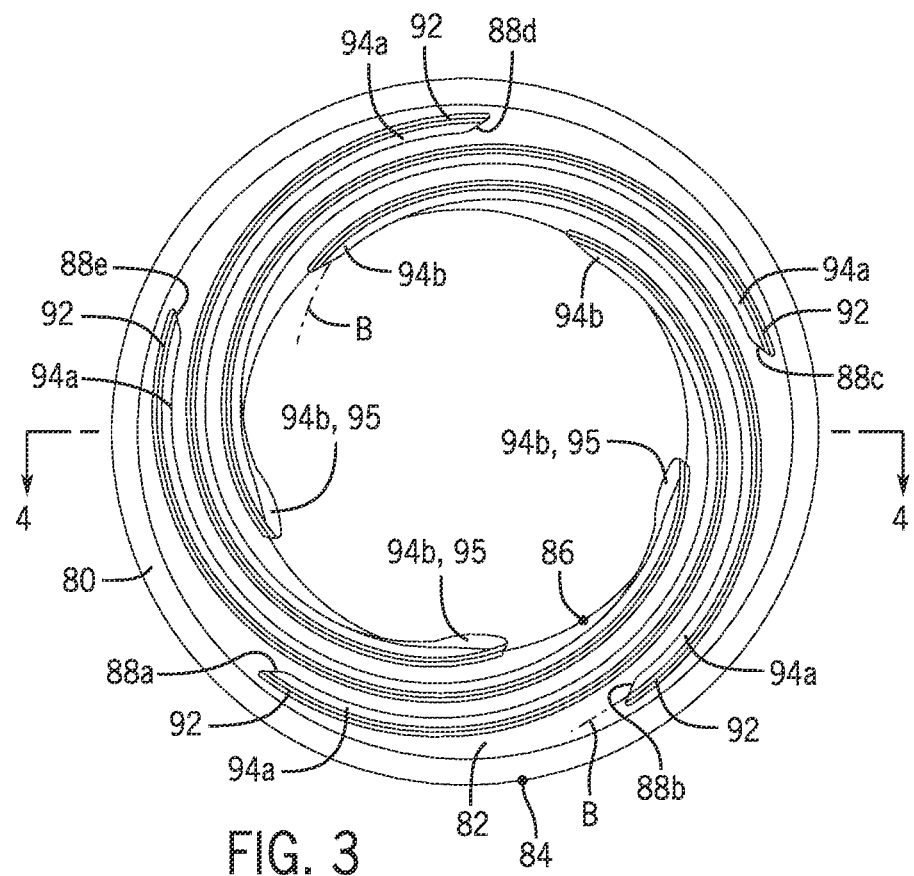
FIG. 3 is an end view of the transition cone without the rotor therein.

Each vane 88 comprises a series of vane segments, as shown in FIG. 4, that are arranged together to form a single vane 88. Alternatively, each vane 88 may comprise a single monolithic component of cast or extruded material, as well as shaped or machined material that extends from end 84 to end 86, as is shown in FIG. 3.

Each vane 88 comprises a body extending along a conical spiral axis B (see, e.g., axis B of vane 88b). It should be understood, however, that the vane body is not limited to a conical spiral shape, and may be straight, helical, curved, or cylindrical, for example. The vane body includes a bottom surface 97 that is configured to be mounted against the surface of cone 80, and an upstanding (or projecting) segment 92 that extends generally away from the bottom surface 97 (as well as the inner surface 82 of transition cone 80).

As best shown in FIGS. 4-5, upstanding segment 92 has an upstream side 93 facing upstream end 84 and a downstream side 94 facing downstream end 86. Sides 93 and 94 are generally disposed on opposite sides of segment 92. As best seen in FIG. 5, surface 97 is positioned between sides 93 and 94, and both sides 93 and 94 intersect surface 97 at respective edges.

A series of openings or thru-holes 99 are disposed on (or adjacent) side 93 and through bottom surface 97. Holes 99 are sized to accommodate fasteners (not shown), which are used to mount vane 88 to cone 80. Vanes 88 are fixed (i.e., stationary) to cone 80 by the fasteners. For each hole 99, the axis of that hole 99 is normal (i.e., perpendicular) to (i) the bottom surface 97 surrounding that hole 99, as well as (ii) the wall of cone 80 directly beneath hole 99. Perpendicularity may not be perfect due to machining and forming constraints, but could be within a tolerance of +/−5%, +/−4%, +/−3%, +/−2%, or +/−1%, for example.

For each vane 88, downstream facing side 94 has an upstream end 94a that is positioned either at or adjacent upstream end 84 of cone 80, and a downstream end 94b that is positioned either at or adjacent downstream end 86 of cone 80. Ends 94a and 94b are positioned at opposite ends of each vane 88. Vanes 88a and 88b have ends 94b that are oriented at or near the top half of rotor 40, whereas vanes 88c-88e have ends 94b that are oriented at or near the bottom half of rotor 40.

For vanes 88a and 88b, the vane body has a substantially constant L-shaped cross section along its entire length. And, for those two vanes 88a and 88b, the entire downstream facing side 94 is oriented normal to bottom (mounting) surface 97 as well as the surface of the cone 80 therebeneath, as viewed in cross-section. The entire downstream facing side 94 is also parallel to holes 99. Vanes 88a and 88b may be identical.

For vanes 88c, 88d and 88e (referred to herein as transitional vanes), those vanes have a substantially constant L-shaped cross section along their lengths (like vanes 88a and 88b) with the exception of the downstream end 94b. At downstream end 94b of vanes 88c-88e, the downstream facing side 94 has a transitional surface 95. The transitional surface 95 is oriented (i) normal (perpendicular) to the common axis A of the rotor 40 and/or rotor cage 42, and/or (ii) normal to the inner surface of the rotor cage 42 that is adjacent and local to the transitional surface 95. Thus, as viewed from end 94a to 94b, the downstream facing side 94 of each vane 88c-88e transitions from an orientation that is normal to bottom surface 97 and the surface of cone 80 therebeneath, to an orientation that is (i) normal to the common axis A of the rotor 40 and/or rotor cage 42, and/or (ii) normal to the segment of the inner surface of the rotor cage 42 that is adjacent and local to the transitional surface 95. Stated differently, an angle formed between surface 94 (at end 94b) and surface 97 differs from an angle formed between surface 94 (at end 94a) and surface 97. Vanes 88c-88e may be identical. As noted above, perpendicularity may not be perfect due to machining and forming constraints, but could be within a tolerance of +/−5%, +/−4%, +/−3%, +/−2%, or +/−1%, for example.

It has been discovered that adding the above-described transition surface 95 on vanes 88c-88e aids in moving the crop from the conical cone 80 to the cylindrical shaped rotor cage 42. This is viewed as a more efficient way to transfer crop from cone 80 to rotor cage 42, which may provide a reduction in the power required for rotor 40 to move crop through the threshing and separating system of the combine, reduced crop recirculation within the threshing and separating system, and reduced wear on the vanes.

Figure 7:
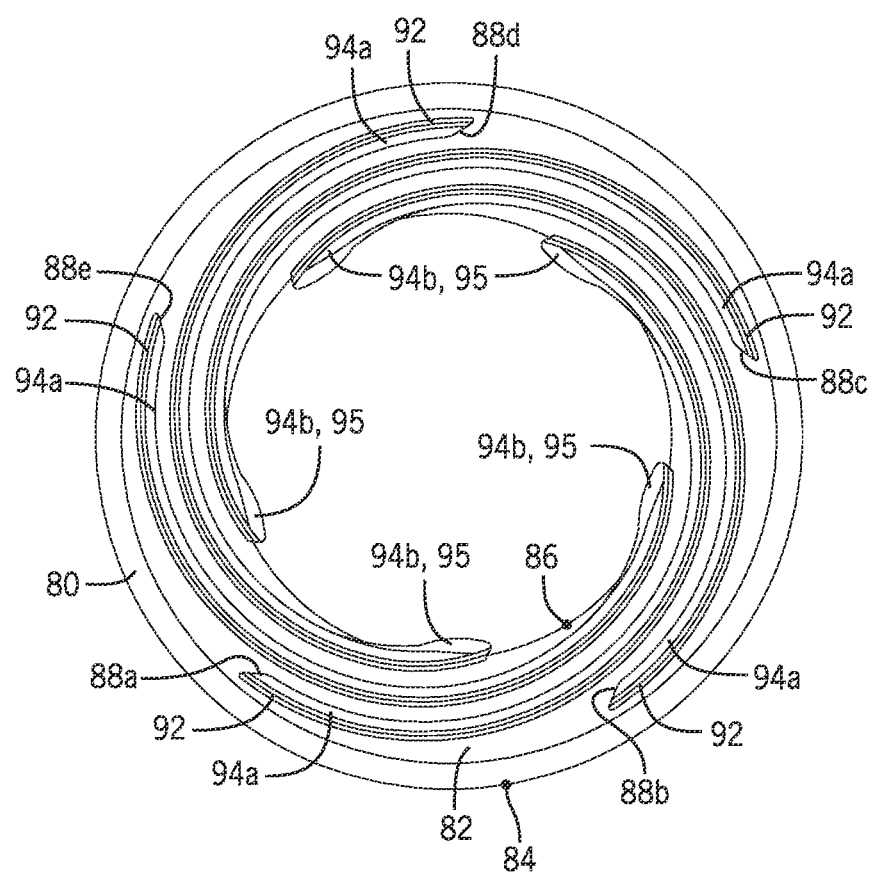
FIG. 7 is an end view of the transition cone without the rotor therein according to another embodiment of the invention.

Although vanes 88a and 88b are described as differing from vanes 88c-88e, it should be understood that vanes 88a and 88b may be the same as vanes 88c-88e, as shown in FIG. 7.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester comprising:
  a rotor,
  a rotor cage surrounding the rotor and including a concave, wherein the rotor cage has a cylindrically shaped interior surface extending along a rotor cage axis;
  a transition cone defining an infeed to said rotor cage, said transition cone having a conical inner surface extending between an upstream end and a downstream end of the cone; and
  a vane mounted to the conical inner surface of said transition cone, said vane protruding radially from the conical inner surface, and extending between said upstream end and said downstream end,
  wherein said vane has a base mounting surface and a projecting segment that projects in a radial direction from the base mounting surface, wherein the projecting segment has a downstream facing side that faces the downstream end of the cone and an upstream facing side that faces the upstream end of the cone, wherein, at or near the upstream end of the cone, the downstream facing side of the vane is oriented perpendicular to the base mounting surface, and, at or near the downstream end of the cone, the downstream facing side of the vane is oriented obliquely to the base mounting surface.

2. The agricultural combine harvester of claim 1, wherein at or near the downstream end of the cone, the downstream facing side of the vane is also oriented perpendicular to a longitudinal axis of the transition cone.

3. The agricultural combine harvester of claim 1, wherein an end of said vane is positioned either at or near the downstream end of the cone, and said end of said vane being positioned at an elevation beneath the rotor.

4. The agricultural combine harvester of claim 3, further comprising a second vane having a body extending along an axis, wherein an end of said second vane is positioned either at or near the downstream end of the cone, and said end of said second vane being positioned at an elevation above the rotor.

5. The agricultural combine harvester of claim 1, wherein the vane is entirely positioned within the cone.

6. The agricultural combine harvester of claim 1, wherein the vane is not positioned within the rotor cage.

7. The agricultural combine harvester of claim 1, wherein said vane extends along a conical spiral axis.

8. The agricultural combine harvester of claim 1, wherein, at or near the downstream end of the cone, the downstream facing side of the vane is oriented non-perpendicular to the base mounting surface.

9. The agricultural combine harvester of claim 1, wherein, at or near the downstream end of the cone, the downstream facing side of the vane extends at a different angle with respect to the base mounting surface as compared with the downstream facing side of the vane at or near the upstream end of the cone.

10. The agricultural combine harvester of claim 1, wherein, at or near the downstream end of the cone, the downstream facing side of the vane is oriented perpendicular to the rotor cage axis.

11. The agricultural combine harvester of claim 1, wherein, at or near the upstream end of the cone, the vane has an L-shape as viewed in cross section, and, at or near the downstream end of the cone, the vane has a V-shape as viewed in cross section.

12. The agricultural combine harvester of claim 1, wherein said vane is monolithic.

13. A transition cone assembly for a combine harvester, the transition cone assembly comprising:

a transition cone having a body extending along a longitudinal axis, the body defining a conical inner surface extending between an upstream end and a downstream end of the cone; and a vane having a base mounting surface that is mounted to the conical inner surface and a projecting segment that projects in a radial direction from the base mounting surface, wherein the projecting segment has a downstream facing side that faces the downstream end of the cone and an upstream facing side that faces the upstream end of the cone, wherein, at or near the upstream end of the cone, the downstream facing side of the vane is oriented perpendicular to the base mounting surface, and, at or near the downstream end of the cone, the downstream facing side of the vane is oriented obliquely to the base mounting surface.

14. The transition cone assembly of claim 13, further comprising a hole disposed through the upstream facing side of the vane and the base mounting surface.

15. The transition cone assembly of claim 13, wherein, at or near the downstream end of the cone, the downstream facing side of the vane is oriented non-perpendicular to the base mounting surface.

16. The transition cone assembly of claim 13, wherein, at or near the downstream end of the cone, the downstream facing side of the vane extends at a different angle with respect to the base mounting surface as compared with the downstream facing side of the vane at or near the upstream end of the cone.

17. The transition cone assembly of claim 13, wherein, at or near the downstream end of the cone, the downstream facing side of the vane is oriented perpendicular to the longitudinal axis of the cone.

18. The transition cone assembly of claim 13, wherein, at or near the upstream end of the cone, the vane has an L-shape as viewed in cross section, and, at or near the downstream end of the cone, the vane has a V-shape as viewed in cross section.

19. The transition cone assembly of claim 13, wherein said vane is monolithic.

\* \* \* \* \*